United States Patent
Maruoka et al.

(10) Patent No.: US 10,530,217 B2
(45) Date of Patent: Jan. 7, 2020

(54) MOTOR HAVING SCREWS WITH DIFFERING PITCH AND SCREW-RECEIVING GROOVE PORTIONS WITH DIFFERING AXIAL LENGTH

(71) Applicant: NIDEC CORPORATION, Kyoto (JP)

(72) Inventors: Seiji Maruoka, Kyoto (JP); Mitsuhiro Takemoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/174,288

(22) Filed: Oct. 30, 2018

(65) Prior Publication Data
US 2019/0165644 A1    May 30, 2019

(30) Foreign Application Priority Data

Nov. 27, 2017   (JP) .................. 2017-226424

(51) Int. Cl.
| | | |
|---|---|---|
| G11B 19/20 | (2006.01) | |
| H02K 7/00 | (2006.01) | |
| H02K 5/10 | (2006.01) | |
| H02K 5/167 | (2006.01) | |
| H02K 21/22 | (2006.01) | |
| F16C 17/02 | (2006.01) | |
| H02K 7/08 | (2006.01) | |

(52) U.S. Cl.
CPC ............ *H02K 7/003* (2013.01); *F16C 17/02* (2013.01); *G11B 19/2036* (2013.01); *H02K 5/10* (2013.01); *H02K 5/1677* (2013.01); *H02K 7/086* (2013.01); *H02K 21/22* (2013.01); *F16C 2380/26* (2013.01)

(58) Field of Classification Search
None
See application file for complete search history.

(56) References Cited

FOREIGN PATENT DOCUMENTS

| JP | 2002-227834 A | 8/2002 |
|---|---|---|
| JP | 2002-339955 A | 11/2002 |

*Primary Examiner* — Craig A. Renner
(74) *Attorney, Agent, or Firm* — Hauptman Ham, LLP

(57) ABSTRACT

A rotating portion includes a hollow shaft extending along a central axis. The hollow shaft includes a through hole passing therethrough in an axial direction. The rotating portion includes an upper screw to close an upper opening that is an opening at an upper end portion of the through hole. The rotating portion includes a lower screw to close a lower opening that is an opening at a lower end portion of the through hole. The hollow shaft includes an upper groove portion into which the upper screw is screwed at the upper opening. The hollow shaft includes a lower groove portion into which the lower screw is screwed at the lower opening. A lubricating oil is in contact with the lower screw. The lower groove portion is shorter in axial length than the upper groove portion, and the lower screw is smaller in axial pitch than the upper screw.

15 Claims, 5 Drawing Sheets

MOTOR HAVING SCREWS WITH DIFFERING PITCH AND SCREW-RECEIVING GROOVE PORTIONS WITH DIFFERING AXIAL LENGTH

RELATED APPLICATIONS

The present application claims priority to Japanese Application No. 2017-226424 filed Nov. 27, 2017, the disclosure of which is hereby incorporated by reference herein in its entirety.

FIELD

At least one embodiment of the present disclosure relates to a motor.

BACKGROUND

Hard disk apparatuses and optical disk apparatuses are equipped with a motor for rotating a disk. A motor is described in, for example, JP-A 2002-339955. The motor described in JP-A 2002-339955 includes a dynamic bearing. The dynamic bearing includes a rotating shaft, a supporting member, and a lubricating oil interposed between the rotating shaft and the supporting member. The rotating shaft is arranged to rotate with respect to the supporting member in a non-contact state. The rotating shaft has a through hole sealed with a sealing screw. This prevents intrusion of the lubricating oil into the through hole.

According to the structure described in JP-A 2002-339955, a disturbance is caused in assembling or driving the motor, so that stress is applied to the shaft (rotating shaft). As a result, there is a possibility that the lubricating oil enters the shaft due to the deformation of the shaft, and other reasons. In addition, when a shaft having an excessively large diameter is used for the purpose of securing the stiffness of the shaft, a size of a motor including this shaft is increased.

SUMMARY

At least one embodiment of the present disclosure helps to provide a structure capable of suppressing deformation of a shaft and suppressing intrusion of a lubricating oil into the shaft even when stress is applied to the shaft because of a disturbance caused in assembling or driving a motor. At least one embodiment of the present disclosure helps to provide a structure applicable to a fine apparatus such as a hard disk apparatus by downsizing a motor including a shaft.

At least one embodiment of the present disclosure relates to a motor including a stationary portion including a stator. The motor further includes and a rotating portion including a magnet arranged opposite to the stator, the rotating portion being supported through a bearing portion to be rotatable about a central axis, which extends in a vertical direction, with respect to the stationary portion, wherein the stationary portion and the rotating portion are arranged opposite to each other with a gap where a lubricating oil exists interposed therebetween, in the bearing portion. The rotating portion further includes a hollow shaft arranged to extend along the central axis, the hollow shaft including a through hole passing therethrough in an axial direction. The motor further includes an upper screw arranged to close an upper opening that is an opening placed at an upper end portion of the through hole. The method further includes a lower screw arranged to close a lower opening that is an opening placed at a lower end portion of the through hole. The hollow shaft further includes an upper groove portion into which the upper screw is screwed at the upper opening. The hollow shaft further includes a lower groove portion into which the lower screw is screwed at the lower opening, a part of the lubricating oil is in contact with the lower screw, the lower groove portion is shorter in axial length than the upper groove portion, and the lower screw is smaller in axial pitch than the upper screw.

According to at least one embodiment of the present disclosure, the lower groove portion into which the lower screw for closing the lower opening of the hollow shaft is screwed is shorter in length than the upper groove portion into which the upper screw for closing the upper opening of the hollow shaft is screwed. In addition, the lower screw is smaller in axial pitch than the upper screw. This arrangement helps to suppress deformation of the shaft even when stress is applied to the shaft because of a disturbance caused in assembling or driving the motor. This results in suppression of intrusion of the lubricating oil into the shaft. This arrangement helps to downsize the motor including the shaft and to apply the motor to a fine apparatus such as a hard disk apparatus.

The above and other elements, features, steps, characteristics and advantages of embodiments of the present disclosure will become more apparent from the following detailed description of embodiments with reference to the attached drawings.

DETAILED DESCRIPTION

Hereinafter, embodiments of the present disclosure will be described with reference to the accompanying drawings. In at least one embodiment of the present disclosure, a direction parallel to a central axis of a motor is referred to by the term "axial direction", "axial", or "axially", that directions perpendicular to the central axis of the motor are referred to by the term "radial direction", "radial", or "radially", and that a direction along a circular arc centered on the central axis of the motor is referred to by the term "circumferential direction", "circumferential", or "circumferentially". Also in at least one embodiment of the present disclosure, the shape of each member or portion and relative positions of different members or portions will be described on the assumption that the axial direction is defined as a vertical direction and a clamp side where a disk is held down is defined as an upper side with respect to a stator. One of ordinary skill in the art would understand that the above definition of the vertical direction is not meant to restrict in any way the orientations of the motor and the disk drive apparatus according to the present disclosure when in use. Also note that the wording "parallel direction" as used in the present disclosure comprehends substantially parallel directions. Also note that the wording "perpendicular direction" as used in the present disclosure comprehends substantially perpendicular directions.

1-1. Structure of Disk Drive Apparatus

Figure 1:
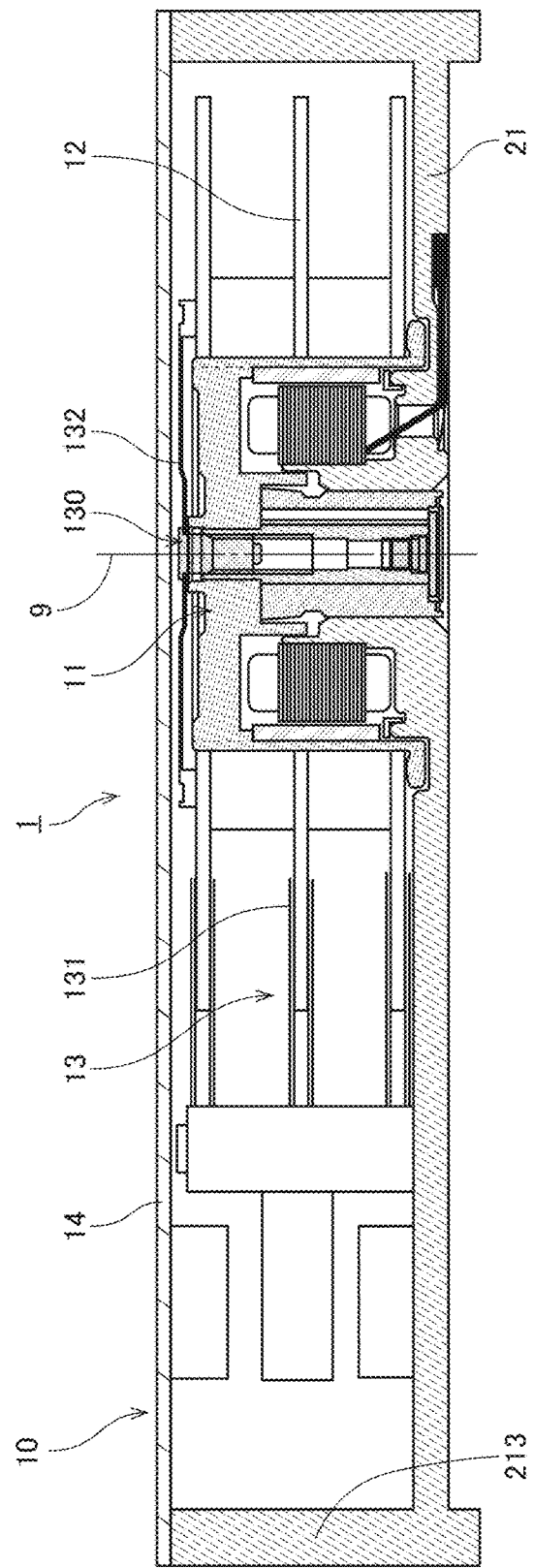
FIG. 1 is a longitudinal sectional view of a disk drive apparatus including a motor according to at least one embodiment.

FIG. 1 is a longitudinal sectional view of a disk drive apparatus 1 including a motor 11 according to at least one embodiment. The disk drive apparatus 1 is an apparatus that reads and writes information from and into a magnetic disk 12 having a circular hole in its center, while rotating the magnetic disk 12. In FIG. 1, the disk drive apparatus 1 includes a motor 11, three magnetic disks 12, an access portion 13, and a cover 14 that constitutes a part of a housing 10.

The motor 11 causes the magnetic disks 12 to rotate about a central axis 9 extending in the vertical direction, while supporting the magnetic disks 12. The motor 11 includes a base portion 21 a part of which extends in the radial direction at a position below the magnetic disks 12. At least a part of the motor 11, the magnetic disks 12, and the access portion 13 are accommodated inside the housing 10 including the base portion 21 and the cover 14. The access portion 13 moves a head 131 along a recording surface of a corresponding magnetic disk 12 to perform at least one of read or write of information from or into the magnetic disk 12. In at least one embodiment, the number of magnetic disks 12 in the disk drive apparatus 1 may be equal to or less than two. In at least one embodiment, the number of magnetic disks 12 in the disk drive apparatus 1 may be equal to or more than four.

The housing 10 has an internal space with which clean air having almost no dust or dirt is filled. This reduces the resistance of gas to the access portion 13. However, the internal space may be filled with helium gas, hydrogen gas, or nitrogen gas, in place of air. In at least one embodiment, the internal space may be filled with a mixed gas of at least one of these gases with air. A joint between the base portion 21 and the cover 14 is sealed with a sealing material such as an elastomer. This sealing helps to keep the internal space of the housing airtight and free of particulates or other contaminants.

1-2. Structure of Motor

Figure 2:
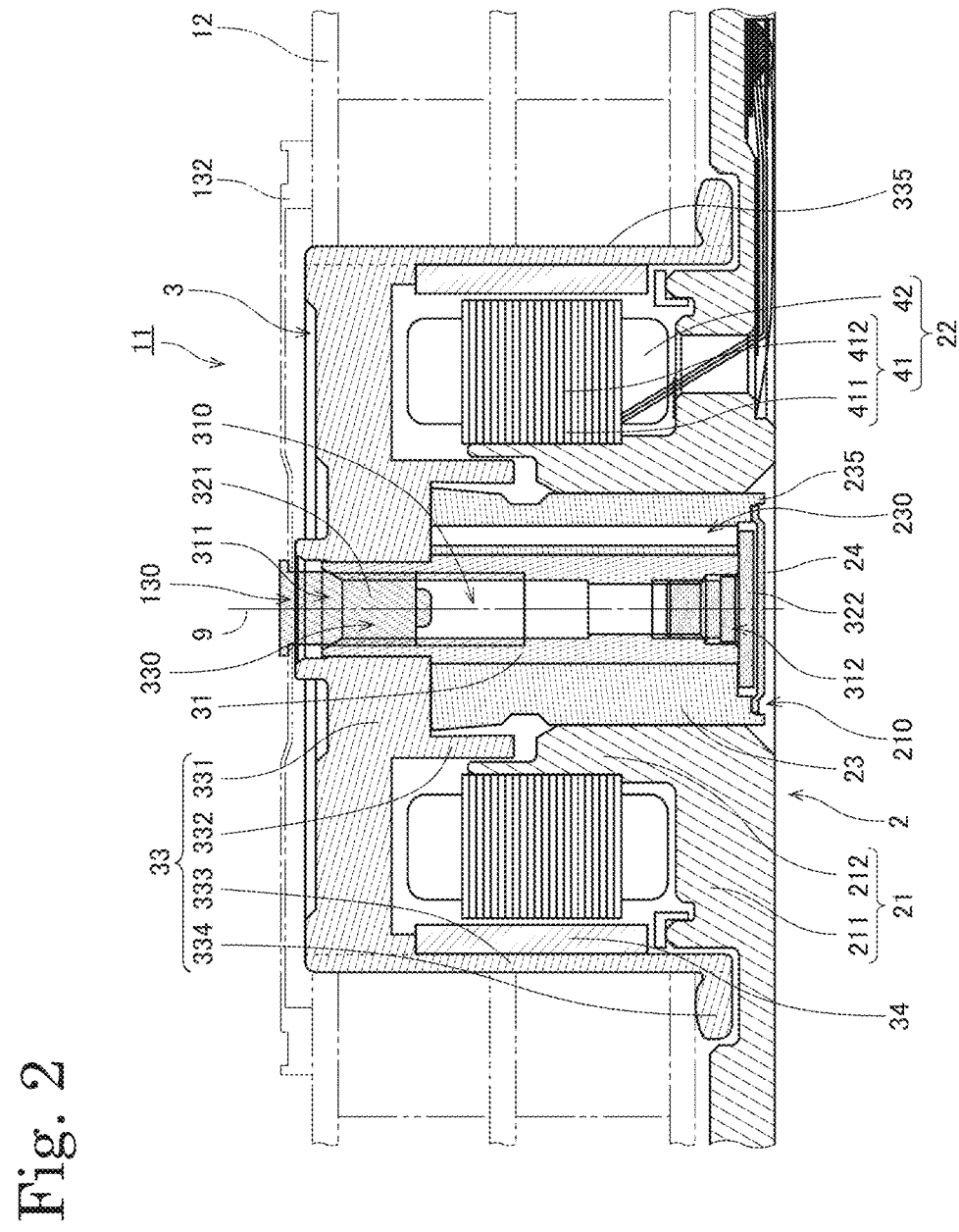
FIG. 2 is a longitudinal sectional view of a motor according to at least one embodiment.

Next, a structure of the motor 11, according to at least one embodiment, will be described. FIG. 2 is a longitudinal sectional view of the motor 11 according to at least one embodiment. Referring to FIG. 2, the motor 11 includes a stationary portion 2, a rotating portion 3, and a bearing portion which will be described later. The stationary portion 2 is stationary relative to the housing 10 of the disk drive apparatus 1. The rotating portion 3 is supported through the bearing portion, which will be described later, to be rotatable about the central axis 9 with respect to the stationary portion 2.

The stationary portion 2 according to at least one embodiment includes the base portion 21, a stator 22, a sleeve 23, and a cap 24.

The base portion 21 supports the stator 22 which will be described later. A metal, such as an aluminum alloy or stainless steel, for example, is used as a material of the base portion 21. The base portion 21 includes a base bottom plate portion 211, a base cylindrical portion 212, and a base sidewall portion 213 (see FIG. 1). The base bottom plate portion 211, the base cylindrical portion 212, and the base sidewall portion 213 are formed continuously.

The base bottom plate portion 211 is a portion that extends in the shape of a plate in a direction perpendicular to the central axis 9 at a position below the rotating portion 3 which will be described later and the magnetic disks 12. In addition, a circuit board for supplying a drive current to the motor 11 is disposed on a lower surface of the base bottom plate portion 211 according to at least one embodiment. The base cylindrical portion 212 is a portion that extends substantially in the shape of a cylinder and also extends upward from a radially inner end portion of the base bottom plate portion 211. In addition, the base cylindrical portion 212 is arranged substantially coaxially with the central axis 9. The base sidewall portion 213 is a portion that extends in the axial direction on a radially outer side of the rotating portion 3 which will be described later, the magnetic disks 12, and the access portion 13. An upper end portion of the base sidewall portion 213 is fixed to a lower surface of a radially outer end portion of the cover 14.

The stator 22 is an armature that includes a stator core 41 and a plurality of coils 42. The stator 22 is placed above at least a part of the base portion 21. The stator core 41 is defined by laminated steel sheets, that is, electromagnetic steel sheets such as silicon steel sheets placed one upon another in the axial direction, for example. The stator core is directly supported by the base portion 21 in such a manner that the stator core 41 is fixed to an outer peripheral surface of the base cylindrical portion 212 with, for example, an adhesive. In at least one embodiment, the stator 22 may be indirectly supported by the base portion 21 through a different member (not illustrated).

The stator core 41 includes an annular core back 411 and a plurality of teeth 412 that project radially outward from the core back 411. The plurality of coils 42 are an aggregate of conducting wires wound around the plurality of teeth 412. A drive current for the motor 11 is supplied from an external power supply (not illustrated) to the coils 42 via the circuit board described above and the conducting wires. The plurality of teeth 412 and the plurality of coils 42 are arranged at substantially regular intervals in an annular shape in the circumferential direction having a center on the central axis 9 according to at least one embodiment.

The sleeve 23 is a member that extends in the axial direction around a hollow shaft 31, which will be described later, in a substantially cylindrical shape. A lower side of the sleeve 23 is inserted into a through hole 210 in the base portion 21, and is fixed by, for example, caulking or adhesion to the base portion 21. In addition, a sleeve through hole 230 is provided in a part of the sleeve 23 in the circumferential direction. The sleeve through hole 230 passes through the sleeve 23 in the axial direction. The sleeve 23 has on a lower end portion an annular protrusion 235. The annular protrusion 235 projects downward from a lower surface of the sleeve 23 at a position radially outside the sleeve through hole 230.

Figure 3:
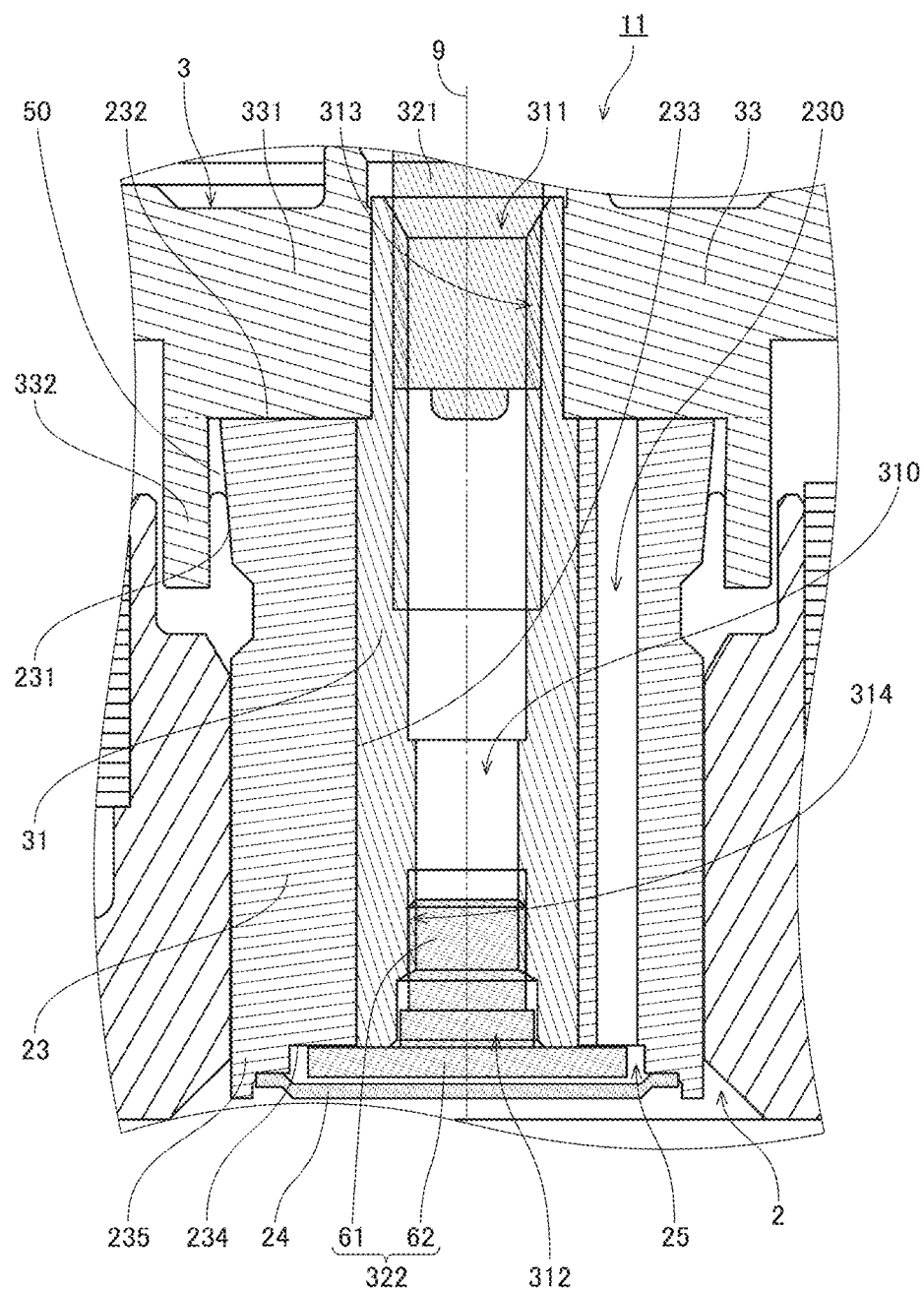
FIG. 3 is a partial longitudinal sectional view of the motor according to at least one embodiment.

The cap 24 is a disk-shaped member for closing an opening in the lower end portion of the sleeve 23. The cap 24 is fixed by, for example, caulking or adhesion to the annular protrusion 235 on the sleeve 23. FIG. 3 is a partial longitudinal sectional view of the motor 11 according to at least one embodiment. Referring to FIG. 3, a part of the sleeve 23 including a radially inner end portion of the lower surface 234 and an upper surface of the cap 24 are opposite to each other in the axial direction with a gap (hereinafter, referred to as "oil sump portion 25") interposed therebetween. In manufacturing the motor 11, the hollow shaft 31 which will be described later is inserted into the radially inner side of the sleeve 23, and the opening (i.e., a lower opening 312 which will be described later) at the lower end portion of the hollow shaft 31 is closed with a lower screw 322 which will be described later. Thereafter, the cap 24 is fixed to the sleeve 23. At this time, gas in the oil sump portion 25 is discharged from the motor 11 to an external space of the motor 11 through the sleeve through hole 230. This reduces resistance in mounting the cap 24 and enables smooth operation of motor 11.

Referring back to FIG. 2, the rotating portion 3 according to at least one embodiment includes the hollow shaft 31, an upper screw 321, the lower screw 322, a hub 33, and a magnet 34.

The hollow shaft 31 is a member that is arranged along the central axis 9 and extends in the axial direction at a radially inner side of the sleeve 23 described above and the hub 33, which will be described later. An inner peripheral surface 233 of the sleeve 23 and an outer peripheral surface of the hollow shaft 31 are opposite to each other in the radial direction with a slight gap interposed therebetween. A metal, such as stainless steel, for example, is used as a material of the hollow shaft 31. The material of the hollow shaft 31 may be either a magnetic material or a non-magnetic material. The hollow shaft 31 may be formed integrally with or separately from the hub 33, which will be described later. A through hole 310 is provided in a radially inner side of the hollow shaft 31 at a position around the central axis 9. The through hole 310 passes through the hollow shaft 31 in the axial direction. An upper opening 311 that is an opening at an upper end portion of the through hole 310 is a hole for retaining the upper screw 321 which will be described later. The lower opening 312 that is an opening at a lower end portion of the through hole 310 is a hole for retaining the lower screw 322 which will be described later. A specific structure of the hollow shaft 31 will be described later.

The upper screw 321 is a metal member that is inserted into the upper opening 311 in the hollow shaft 31 to close the upper opening 311. The upper screw 321 fixes, to the hollow shaft 31, a clamp 132 for holding down each magnetic disk 12. The lower screw 322 is a metal member that is inserted into the lower opening 312 in the hollow shaft 31 to close the lower opening 312. The lower screw 322 includes a lower screw shaft portion 61 and a lower screw disk portion 62. The lower screw shaft portion 61 is a portion that extends through the through hole 310 in a columnar shape. The lower screw disk portion 62 is a portion that extends in the radial direction in a disk shape and is connected to a lower surface of the lower screw shaft portion 61. In a state in which the lower screw 322 is inserted into the lower end portion of the through hole 310, the lower surface 234 of the sleeve 23 and an upper surface of the lower screw disk portion 62 are opposite to each other in the axial direction with a slight gap interposed therebetween. The lower screw disk portion 62 is placed at the oil sump portion 25. In addition, the lower surface of the lower screw disk portion 62 and the upper surface of the cap 24 are opposite to each other in the axial direction with a slight gap interposed therebetween. In at least one embodiment, each of the upper screw 321 and the lower screw 322 may be made of a resin. A specific structure of each of the upper screw 321 and the lower screw 322 will be described later.

The hub 33 is a member that extends in an annular shape at a position around the central axis 9. The hub 33 includes a hub tubular portion 331, a hub drooping portion 332, a yoke portion 333, and a flange portion 334. The hub tubular portion 331, the hub drooping portion 332, the yoke portion 333, and the flange portion 334 are formed continuously.

The hub tubular portion 331 is a portion that extends radially outward from an upper side of the hollow shaft 31 in an annular shape and is fixed to the outer peripheral surface of the hollow shaft 31. An upper surface 232 of the sleeve 23 described above and a lower surface of the hub tubular portion 331 are opposite to each other in the axial direction with a slight gap interposed therebetween. A through hole 330 is provided in a radially inner side of the hub tubular portion 331 and passes through the hub 33 in the axial direction. An upper end portion of the hollow shaft 31 is press-fitted into the through hole 330. In at least one embodiment, an outer peripheral surface of the upper end portion of the hollow shaft 31 may be further fixed by adhesion to an inner peripheral surface of the hub tubular portion 331. In addition, the outer peripheral surface of the upper end portion of the hollow shaft 31 may be fixed to the inner peripheral surface of the hub tubular portion 331 only by press-fitting or adhesion. In at least one embodiment, the outer peripheral surface of the upper end portion of the hollow shaft 31 may be fixed to the inner peripheral surface of the hub tubular portion 331 by another method such as shrink-fitting.

The hub drooping portion 332 is a portion that extends downward in the axial direction from a part of the lower surface of the hub tubular portion 331 in an annular shape. A lower end portion of the hub drooping portion 332 is placed radially inside an upper end portion of the base cylindrical portion 212 described above, and is also placed radially outside the sleeve 23. An upper side of an outer peripheral surface 231 of the sleeve 23 and an inner peripheral surface of the hub drooping portion 332 are opposite to each other in the radial direction with a slight gap interposed therebetween.

The yoke portion 333 is a portion that extends downward in the axial direction from a radially outer end portion of the hub tubular portion 331 in a cylindrical shape. An outer peripheral surface of the magnet 34 which will be described later is fixed to a lower side of an inner peripheral surface of the yoke portion 333. The yoke portion 333 is arranged substantially coaxially with the central axis 9. A ferromagnetic body, such as iron, is used as a material of the hub 33 including the yoke portion 333. This arrangement helps to prevent a magnetic flux generated from the magnet 34 which will be described later, from escaping to the outside. An outer peripheral surface 335 of the yoke portion 333 is fitted into a circular hole in each magnetic disk 12. At least a part of an inner peripheral portion of each magnetic disk 12 is in contact with the outer peripheral surface 335 of the yoke portion 333. With this, the magnetic disks 12 are supported while being positioned in the radial direction.

The flange portion 334 is a portion that extends radially outward from a lower end portion of the yoke portion 333. The magnetic disks 12 are disposed above the flange portion 334. A lower surface of a lower one of the magnetic disks 12 is in contact with at least a part of an upper surface of the flange portion 334. With this, the magnetic disks 12 are supported while being positioned in the axial direction.

The magnet 34 is fixed to the inner peripheral surface of the yoke portion 333 with, for example, an adhesive. An annular permanent magnet is used as the magnet 34 according to at least one embodiment. The magnet 34 is formed in a substantially cylindrical shape, and is placed radially outside the stator 22. An inner peripheral surface of the magnet 34 and radially outer end surfaces of the teeth 412 of the stator 22 are opposite to each other in the radial direction with a slight gap interposed therebetween. In addition, the inner peripheral surface of the magnet 34 includes north poles and south poles arranged to alternate with each other in the circumferential direction. In at least one embodiment, a plurality of magnets may be used instead of the annular magnet 34. In the case of using the plurality of magnets, the lower side of the inner peripheral surface of the yoke portion 333 may include north poles and south poles such that the magnetic pole surfaces of the north poles and the magnetic pole surfaces of the south poles are arranged to alternate in the circumferential direction.

Next, the structure of the bearing portion will be described. Referring to FIG. 3, the stationary portion 2 including the sleeve 23 and the cap 24 and the rotating portion 3 including the hollow shaft 31, the lower screw 322, the hub tubular portion 331, and the hub drooping portion 332 are opposite to each other with a slight gap interposed therebetween. The gap is filled with a lubricating oil 50. A polyol ester-based oil or a diester-based oil, for example, is used as the lubricating oil 50. A dynamic groove (not illustrated) is provided in the upper surface 232, the inner peripheral surface 233, the lower surface 234, and the like of the sleeve 23. At the time when the motor 11 rotates, the dynamic groove (not illustrated) induces fluid dynamic pressure in the lubricating oil 50. With this, the rotating portion 3 is supported by the stationary portion 2 to stably rotate in driving the motor 11. In at least one embodiment, the bearing portion is constituted in such a manner that the sleeve 23 and the cap 24 that are stationary members and the hollow shaft 31, the lower screw 322, the hub tubular portion 331, and the hub drooping portion 332 that are rotating members. The stationary members and the rotating members are opposite to each other with the gap where the lubricating oil 50 is interposed therebetween.

In at least one embodiment, the lubricating oil 50 consecutively is present in the gap between the upper side of the outer peripheral surface 231 of the sleeve 23 and the inner peripheral surface of the hub drooping portion 332, the gap between the upper surface 232 of the sleeve 23 and the lower surface of the hub tubular portion 331, the gap between the inner peripheral surface 233 of the sleeve 23 and the outer peripheral surface of the hollow shaft 31, and the oil sump portion 25. In other words, the bearing portion has a so-called full fill structure in which the lubricating oil 50 consecutively exists in the gap where the stationary portion 2 and the rotating portion 3 are opposite to each other. This arrangement helps to suppress contact of the stationary portion 2 with the rotating portion 3 even when an impact is applied in rotating the motor 11. In at least one embodiment, an interface of the lubricating oil 50 is placed at the gap between the upper side of the outer peripheral surface 231 of the sleeve 23 and the inner peripheral surface of the hub drooping portion 332. As described above, the rotation is further stabilized in such a manner that the lower screw disk portion is placed at the oil sump portion 25. In at least one embodiment, that motor 11 may include other types of bearing such as a plain bearing or a ball bearing, in place of the fluid dynamic bearing.

In the motor 11, when a drive current is supplied to the coils 42 via the circuit board described above, a magnetic flux is generated at the plurality of teeth 412. Then, interaction between the magnetic flux of the teeth 412 and the magnetic flux of the magnet 34 produces a circumferential torque between the stationary portion 2 and the rotating portion 3. As a result, the rotating portion 3 rotates about the central axis 9 with respect to the stationary portion 2. In addition, the magnetic disks 12 mounted on the hub 33 also rotate about the central axis 9 together with the rotating portion 3.

1-3. Structures of Hollow Shaft, Upper Screw, and Lower Screw

Next, structures of the hollow shaft 31, upper screw 321, and lower screw 322 according to at least one embodiment will be described.

As described above, an upper groove portion 313 into which the upper screw 321 is screwed is formed from the upper opening 311 in the hollow shaft 31 to a position near the upper end portion of the through hole 310. In manufacturing the motor 11, the through hole 310 is formed in such a manner that a columnar drill is inserted in the axial direction into an upper end portion of a columnar member serving as a base material of the hollow shaft 31, for example. Thereafter, the upper groove portion 313 is formed from the upper opening 311 to the position near the upper end portion of the through hole 310 with a tap or the like. The upper screw 321 is fixed to the upper groove portion 313 in such a manner that the upper screw 321 is inserted into the through hole 310 through the upper opening 311 and then the upper screw 321 is screwed into the upper groove portion 313. In addition, the upper screw 321 is fixed to the upper groove portion 313 through a through hole 130 (see FIGS. 1 and 2) provided in the clamp 132 described above. The upper screw 321 thus fixes the clamp 132 for holding down the magnetic disks 12, and closes the upper opening 311.

A lower groove portion 314 into which the lower screw 322 is screwed is formed from the lower opening 312 in the hollow shaft 31 to a position near the lower end portion of the through hole 310. In manufacturing the motor 11, the through hole 310 is formed, and then the lower groove portion 314 is formed from the lower opening 312 to the position near the lower end portion of the through hole 310 with a tap or the like. The lower screw 322 is fixed to the lower groove portion 314 in such a manner that the lower screw 322 is inserted into the through hole 310 through the lower opening 312 and then the lower screw 322 is screwed into the lower groove portion 314. In the state in which the lower screw 322 is fixed, the lower screw disk portion 62 is in contact with the entire periphery of the lower surface of the hollow shaft 31 in the circumferential direction with clearance between the lower screw disk portion 62 and the hollow shaft 31 reduced. This arrangements helps to suppress intrusion of the lubricating oil 50 near the oil sump portion 25 into the through hole 310 in the hollow shaft 31. This results in suppression of degradation in the hollow shaft 31 and the bearing portion.

Figure 4:
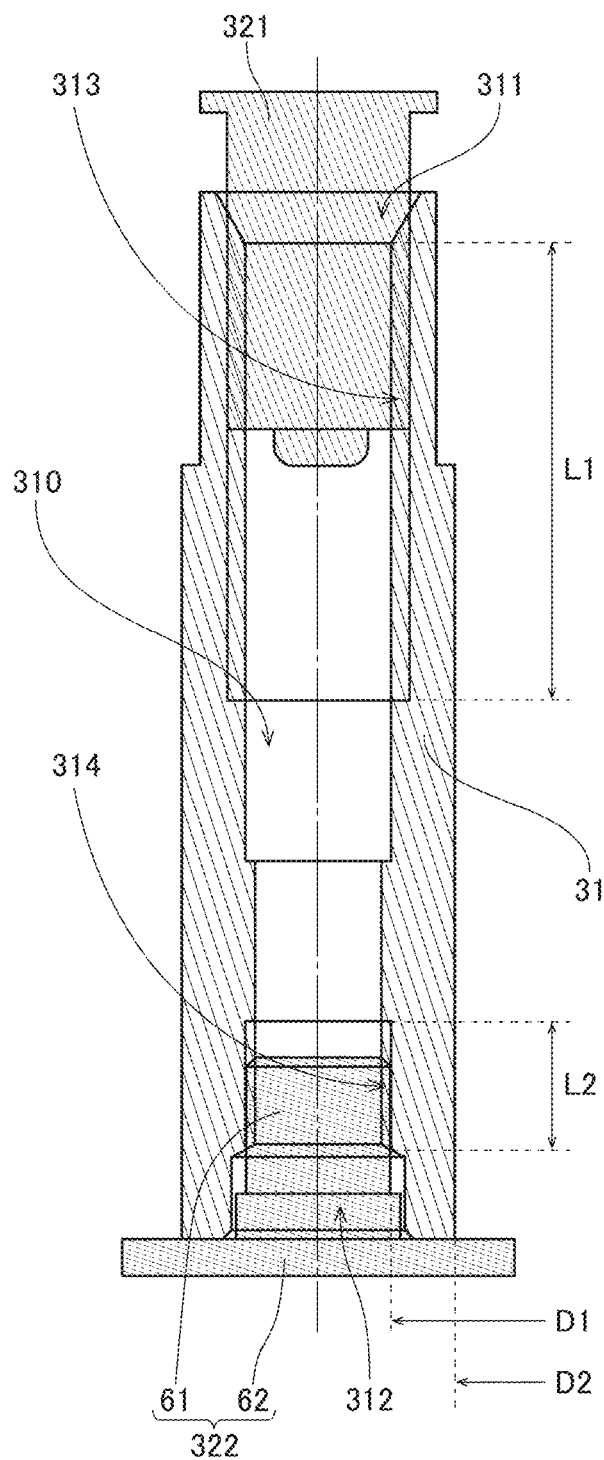
FIG. 4 is a longitudinal sectional view of a hollow shaft, an upper screw, and a lower screw according to at least one embodiment.

FIG. 4 is a longitudinal sectional view of the hollow shaft 31, the upper screw 321, and the lower screw 322 according to at least one embodiment. Referring to FIG. 4, an axial length L2 of the lower groove portion 314 according to at least one embodiment is shorter than an axial length L1 of the upper groove portion 313. For example, in at least one embodiment, the axial length L1 of the upper groove portion 313 is set within a range from 5.0 mm or more to 6.0 mm or less, and the axial length L2 of the lower groove portion 314 is set within a range from 2.0 mm or more to 3.0 mm or less. As described above, when the axial length L2 of the lower groove portion 314 is shortened, the stiffness of a part of the rotating portion 3, the part being placed near the bearing portion, can be enhanced. This arrangement helps to suppress deformation of the hollow shaft 31 even when stress is applied to the hollow shaft 31 because of a disturbance caused in assembling or driving the motor 11.

Figure 5:
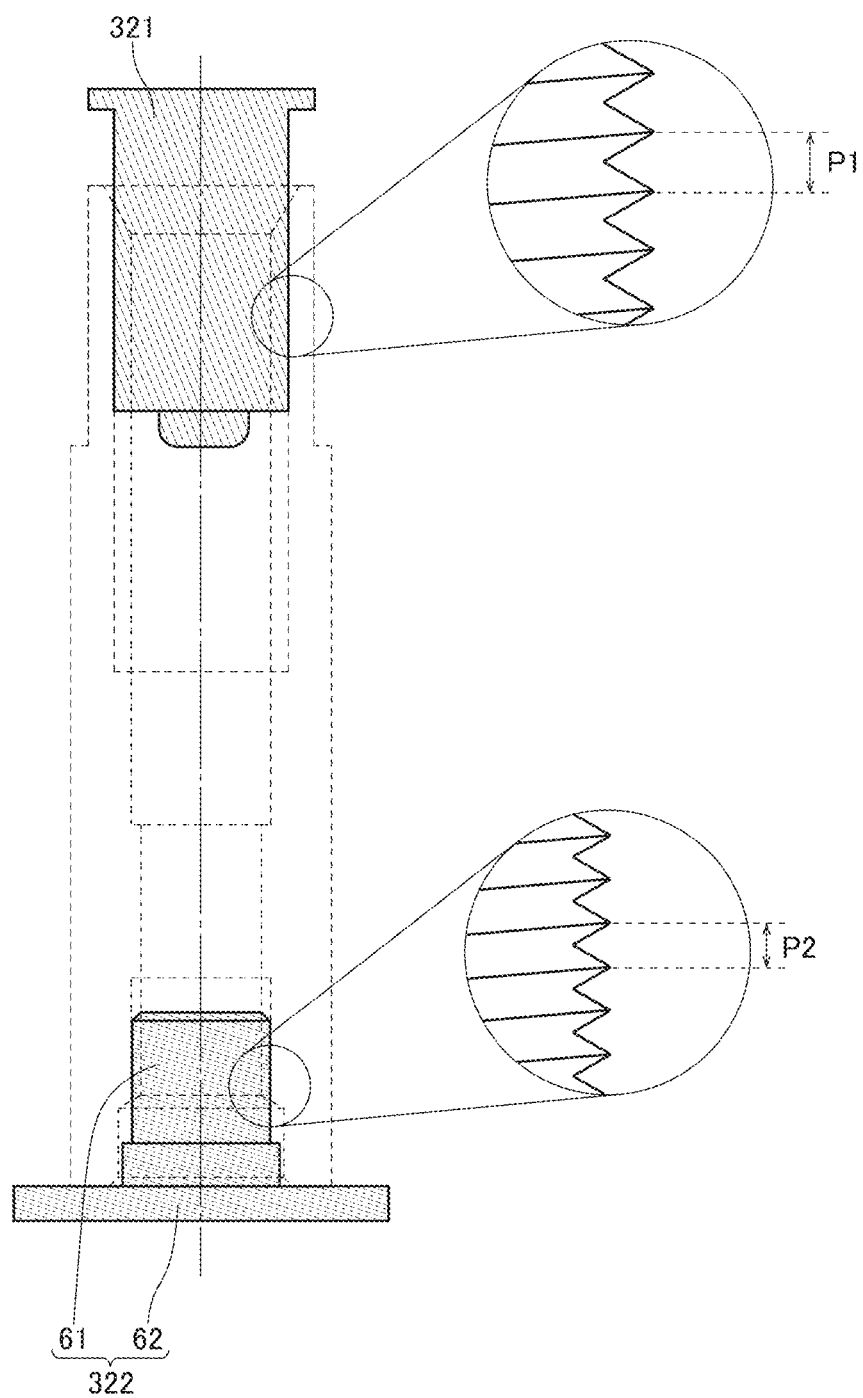
FIG. 5 is a longitudinal sectional view of the upper screw and the lower screw according to at least one embodiment.

FIG. 5 is a longitudinal sectional view of the upper screw 321 and the lower screw 322 according to at least one embodiment. Referring to FIG. 5, an axial pitch P2 of the lower screw 322 according to at least one embodiment is smaller than an axial pitch P1 of the upper screw 321. For example, in at least one embodiment, the axial pitch P1 of the upper screw 321 is set within a range from 0.3 mm or more to 0.5 mm or less, and the axial pitch P2 of the lower screw 322 is set within a range from 0.1 mm or more to 0.3 mm or less. As described above, when the axial pitch P2 of the lower screw 322 is reduced, the lower screw 322 can be screwed into the lower groove portion 314 in the hollow shaft 31 with clearance between the lower screw 322 and the lower groove portion 314 further reduced. This results in suppression of intrusion of the lubricating oil 50 into the hollow shaft 31 and further suppression of degradation in the hollow shaft 31 and the bearing portion.

Referring to FIG. 4, in at least one embodiment, an outside diameter D2 of the hollow shaft 31 is larger by a range from 1.5 times or more to 2.0 times or less than an outside diameter D1 of a part of the lower screw 322, the part being screwed into the lower groove portion 314. As described above, when the hollow shaft 31 has a satisfactory thickness, the stiffness of a part of the hollow shaft 31, the part being placed near the bearing portion, can be enhanced. This makes it possible to suppress deformation of the hollow shaft 31 even when stress is applied to the hollow shaft 31 because of a disturbance caused in assembling or driving the motor 11. At the same time, since the outside diameter of the hollow shaft 31 is not excessively large, the motor 11 including the hollow shaft 31 is able to have a reduced size. This arrangement helps to apply the motor 11 to a fine apparatus such as a hard disk apparatus.

In addition, an adhesive (not illustrated) is disposed between the hollow shaft 31 and the lower screw 322 in the radial direction, at a position where the hollow shaft 31 according to at least one embodiment and the lower screw 322 overlap with each other in the radial direction. The adhesive is placed over the entire periphery in the circumferential direction between the hollow shaft 31 and the lower screw 322 in the radial direction. This arrangement helps to fix the lower screw 322 to the inner peripheral surface of the hollow shaft 31 while further reducing clearance between the lower screw 322 and the inner peripheral surface of the hollow shaft 31. This results in suppression of intrusion of the lubricating oil 50 into the hollow shaft 31 and further suppression of degradation in the hollow shaft 31 and the bearing portion.

While at least one embodiment has been described above, one of ordinary skill in the art would understand that the present disclosure is not limited to the above-described at least one embodiment.

The motor 11 according the above-described at least one embodiment is used as a spindle motor that causes a magnetic disk to rotate. In at least one embodiment, an impeller or a flywheel may be used in place of the magnetic disk according to at least one embodiment. The motor according to at least one embodiment may be used as a fan motor for supplying an airflow.

At least one embodiment of the present disclosure can be used in, for example, a motor.

Features of the above-described embodiments and the modifications thereof may be combined appropriately as long as no conflict arises.

While embodiments of the present disclosure have been described above, one of ordinary skill in the art would understand that variations and modifications will be apparent to those skilled in the art without departing from the scope and spirit of the present disclosure. The scope of the present disclosure, therefore, is to be determined solely by the following claims.

What is claimed is:

1. A motor comprising:
a stationary portion including a stator;
a rotating portion supported through a bearing portion to be rotatable about a central axis with respect to the stationary portion, wherein the rotating portion comprises:
   a magnet opposite to the stator,
   a hollow shaft extending along the central axis, wherein the hollow shaft includes a through hole passing therethrough in an axial direction;
   an upper screw, wherein the upper screw closes a first opening at a first end portion of the through hole,
   a lower screw, wherein the lower screw closes a second opening at a second end portion of the through hole, and an axial pitch of the lower screw is smaller than an axial pitch of the upper screw,
   the hollow shaft further includes:
      an upper groove portion for receiving the upper screw, and
         a lower groove portion for receiving the lower screw, wherein an axial length of the lower groove portion is shorter than an axial length of the upper groove portion; and
a gap between the stationary portion and the rotating portion, wherein the gap includes a lubricating oil therein, and the lubricating oil contacts the lower screw.

2. The motor according to claim 1, wherein
the stationary portion further includes:
   a sleeve around the hollow shaft, wherein the sleeve extends in the axial direction;
   a cap closing a first opening at a first end portion of the sleeve; and
   an oil sump portion in contact with the lubricating oil, wherein the oil sump portion includes an axial gap between a radially inner end portion of the sleeve and a surface of the cap.

3. The motor according to claim 1, wherein
the lower screw includes:
   a lower screw shaft portion in the through hole; and
   a lower screw disk portion connected to a surface of the lower screw shaft portion, wherein the lower screw disc portion extends in a radial direction, and a part of the lower screw disk portion is in the oil sump portion.

4. The motor according to claim 1, wherein
the axial pitch of the upper screw ranges from 0.3 millimeters (mm) to 0.5 mm.

5. The motor according to claim 1, wherein
the axial pitch of the lower screw ranges from 0.1 mm to 0.3 mm.

6. The motor according to claim 1, wherein
the axial length of the upper groove portion ranges from 5.0 mm to 6.0 mm.

7. The motor according to claim 1, wherein
the axial length of the lower groove portion ranges from 2.0 mm to 3.0 mm.

8. The motor according to claim 1, wherein
a ratio between an outside diameter of the hollow shaft and an outside diameter of a part of the lower screw ranges from 1.5 times to 2.0 times, and the part of the lower screw is screwed into the lower groove portion.

9. The motor according to claim 1, wherein
the rotating portion further includes an adhesive between the hollow shaft and the lower screw in a radial direction.

10. The motor according to claim 9, wherein
the adhesive is over an entire periphery in a circumferential direction between the hollow shaft and the lower screw in the radial direction.

11. The motor according to claim 1, wherein
the lubricating oil substantially fills the gap.

12. A disk drive comprising:
a motor, wherein the motor comprises:
    a stationary portion including a stator;
    a rotating portion supported through a bearing portion to be rotatable about a central axis with respect to the stationary portion, wherein the rotating portion comprises:
        a magnet opposite to the stator,
        a hollow shaft extending along the central axis, wherein the hollow shaft includes a through hole passing therethrough in an axial direction;
        an upper screw, wherein the upper screw closes a first opening at a first end portion of the through hole,
        a lower screw, wherein the lower screw closes a second opening at a second end portion of the through hole, and an axial pitch of the lower screw is smaller than an axial pitch of the upper screw,
    the hollow shaft further includes:
        an upper groove portion for receiving the upper screw, and
        a lower groove portion for receiving the lower screw, wherein an axial length of the lower groove portion is shorter than an axial length of the upper groove portion; and
    a gap between the stationary portion and the rotating portion, wherein the gap includes a lubricating oil therein, and the lubricating oil contacts the lower screw; and
    a plurality of magnetic disks connected to the rotating portion.

13. The disk drive according to claim 12, wherein
the stationary portion further includes:
    a sleeve around the hollow shaft, wherein the sleeve extends in the axial direction;
    a cap closing a first opening at a first end portion of the sleeve; and
    an oil sump portion in contact with the lubricating oil, wherein the oil sump portion includes an axial gap between a radially inner end portion of the sleeve and a surface of the cap.

14. The disk drive according to claim 12, wherein
the lower screw includes:
    a lower screw shaft portion in the through hole; and
    a lower screw disk portion connected to a surface of the lower screw shaft portion, wherein the lower screw disc portion extends in a radial direction, and a part of the lower screw disk portion is in the oil sump portion.

15. The disk drive according to claim 12, wherein
a ratio between an outside diameter of the hollow shaft and an outside diameter of a part of the lower screw ranges from 1.5 times to 2.0 times, and the part of the lower screw is screwed into the lower groove portion.

* * * * *